United States Patent
Sullivan

[15] 3,700,043
[45] Oct. 24, 1972

[54] DEPTH CONTROL MEANS FOR A MOLDBOARD PLOW

[72] Inventor: James Franklin Sullivan, East Moline, Ill.

[73] Assignee: Deere & Company, Moline, Ill.

[22] Filed: July 26, 1971

[21] Appl. No.: 166,018

[52] U.S. Cl. ............... 172/400, 172/411, 172/414, 172/485, 74/526
[51] Int. Cl. .............................................. A01b 63/16
[58] Field of Search...... 172/400, 411, 406, 413, 414, 172/485, 487

[56] References Cited

UNITED STATES PATENTS

| | | | |
|---|---|---|---|
| 2,298,553 | 10/1942 | Ego | 172/411 |
| 2,329,193 | 9/1943 | Frank | 172/411 |
| 2,939,539 | 6/1960 | Kramer | 172/400 X |
| 2,985,246 | 5/1961 | Shipp | 172/400 X |
| 3,228,484 | 1/1966 | Arnold et al. | 172/400 |
| 3,481,407 | 12/1969 | Arnold et al. | 172/400 X |
| 3,534,820 | 10/1970 | Groenke | 172/413 |

*Primary Examiner*—Robert E. Pulfrey
*Assistant Examiner*—R. T. Rader
*Attorney*—H. Vincent Harsha et al.

[57] ABSTRACT

A pivoted stop member on a drawn plow prevents lowering movement of the plow frame on the front furrow wheel to a normal plowing position when in a first position and to a land-opening position below the normal plowing position when in a second position. Provision is also made to independently adjust the normal plowing position of the frame with respect to the front furrow wheel and the land-opening position of the frame with respect to the front furrow wheel.

15 Claims, 5 Drawing Figures

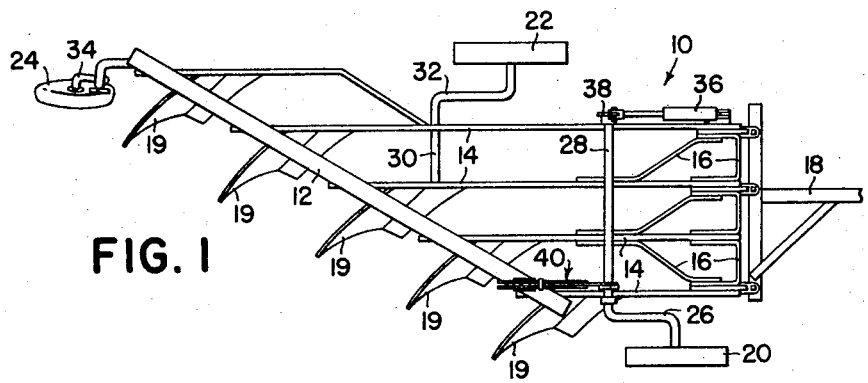
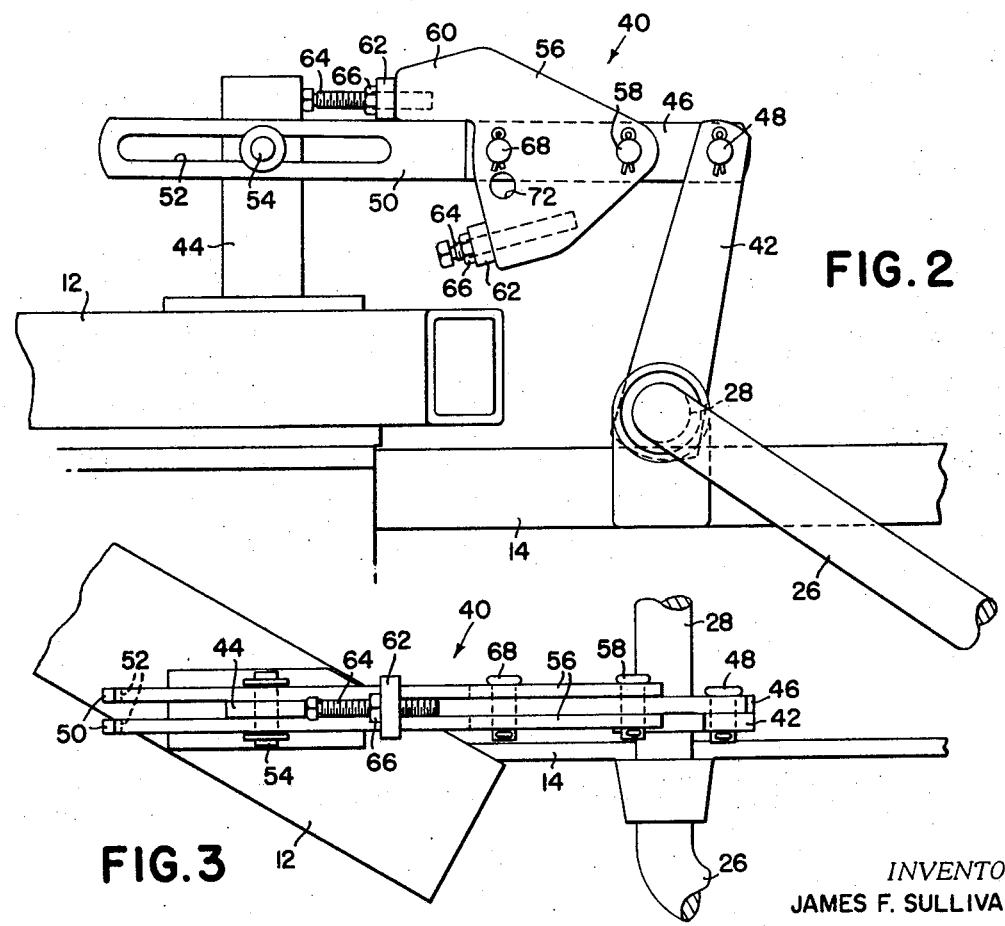
INVENTOR.
JAMES F. SULLIVAN
BY R L Hollister
ATTORNEY

DEPTH CONTROL MEANS FOR A MOLDBOARD PLOW

BACKGROUND OF THE INVENTION

The present invention relates generally to agricultural implements, and more particularly relates to moldboard plows having a frame movable vertically on a front furrow wheel.

The present invention has particular application to either semi-mounted or drawn plows having a front furrow wheel. When plowing with this type of plow, it is necessary when first starting to plow a field to make what is called a land-opening pass. During this pass, the front furrow wheel runs on unplowed land. In subsequent passes, the front furrow wheel is disposed in a furrow left from the preceding pass. Because the front furrow wheel is lower during the subsequent passes, the plow will work at a greater depth if no adjustment is provided for varying the position of the plow on the front furrow wheel. It has been customary to vary the position of the plow frame on the front furrow wheel through the use of a screw crank adjustment such as illustrated in U.S. Pat. No. 3,228,484 which issued 11 Jan. 1966 to Loren G. Arnold.

With a screw crank adjustment, it was necessary for the operator, prior to making a land-opening pass, to turn the screw crank until the plow frame was disposed in a position lower than that used when the front furrow wheel can run in a furrow by a distance equal to the exact plowing depth desired. After the land-opening pass was made, the operator had to again turn the screw crank to raise the frame on the front furrow wheel and had to make a fine adjustment so that the front plow bottom would work at precisely the same depth as the previously formed furrow. This operation has been time consuming and it was also very difficult to properly position the plow frame at precisely the right position for normal plowing.

SUMMARY OF THE INVENTION

The principal object of the present invention is to provide a simplified depth control mechanism for a plow having a front furrow wheel which selectively limits the lowering movement of the plow frame on the front furrow wheel to a normal plowing position or a land-opening position.

Another object of the present invention is to provide a depth control member for a plow having a front furrow wheel which is pivotally mounted for movement between a first position in which it limits the lowering movement of the plow frame on the front furrow wheel to a normal plowing position and a second position in which it limits the lowering movement of the plow frame on the front furrow wheel to a land-opening position below the normal plowing position.

A more specific object of the present invention is to provide a depth control mechanism for a plow having a front furrow wheel which selectively limits the lowering movement of the plow frame on the front furrow wheel to a normal plowing position or a land-opening position below the normal plowing position and which includes simple adjustments which permit adjustment in the position of the frame with respect to the front furrow wheel in either the normal plowing position or the land-opening position without affecting the other position.

The above objects and additional objects and advantages of the present invention will become apparent to those skilled in the art from a reading of the following detailed description when taken in conjunction with the accompanying drawings.

BRIEF DESCRIPTION OF THE DRAWINGS

In the drawings:

FIG. 1 is a top plan view of a drawn plow embodying the stop mechanism according to the present invention;

FIG. 2 is a side elevational view of a portion of a plow illustrated in FIG. 1, and showing the stop mechanism and its associated parts in a normal plowing position;

FIG. 3 is a top plan view of the structure illustrated in FIG. 2;

DESCRIPTION OF THE PREFERRED EMBODIMENT

Figure 4:
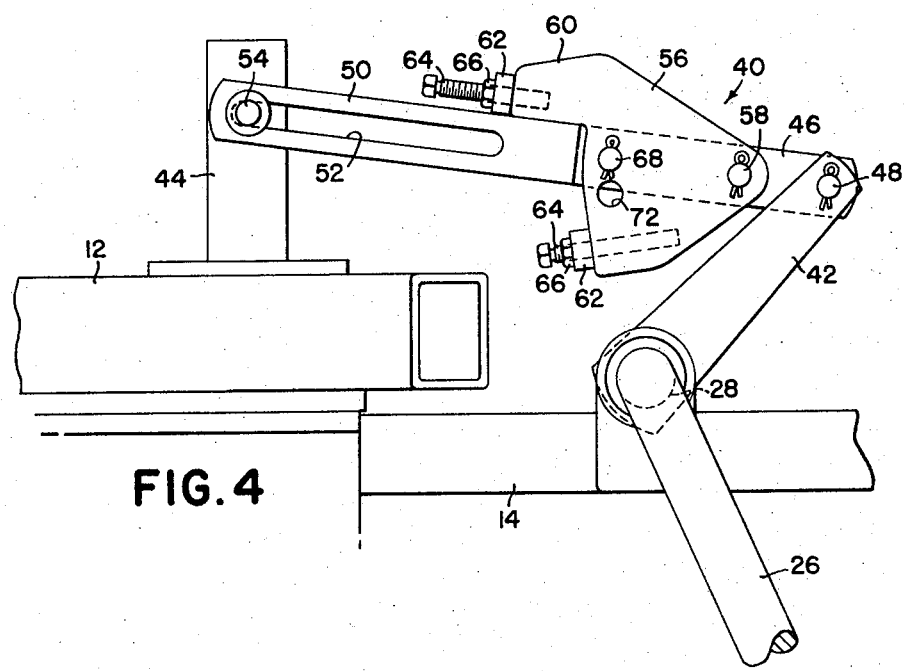
FIG. 4 is a view similar to FIG. 2 but illustrating the stop mechanism and associated parts in a raised transport position; and, FIG. 5 is a view similar to FIG. 2 but illustrating the stop mechanism and its associated parts in a land-opening position.
Figure 5:
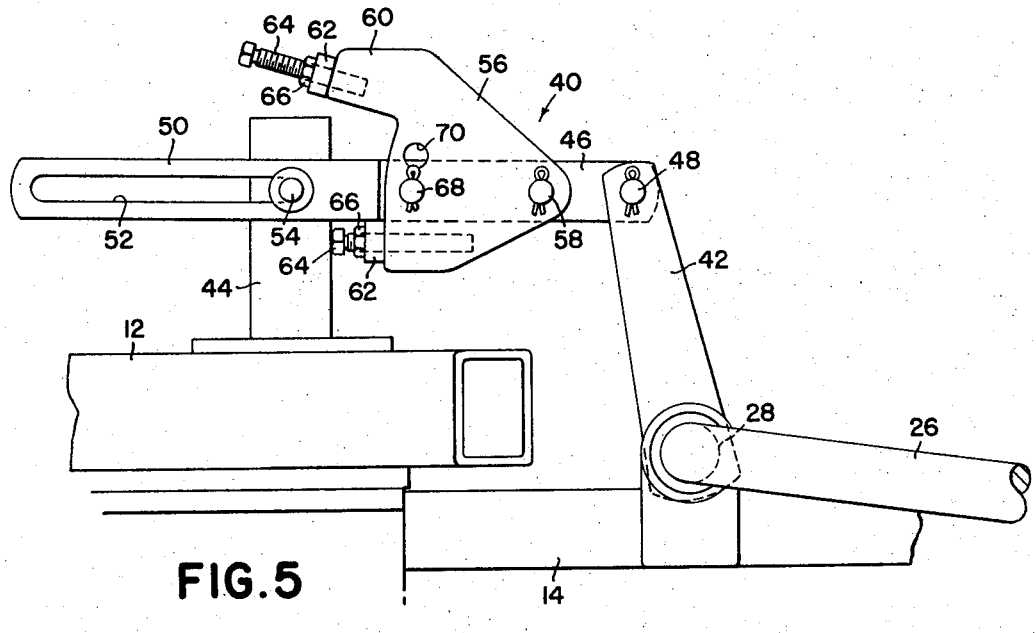

Referring now to the drawings, a plow indicated generally at 10 is illustrated in FIG. 1 and includes a frame consisting of a diagonally extending box beam 12 and a plurality of longitudinal frame bars 14. The rear ends of the frame bars 14 are secured to the box beam 12 and their forward ends are interconnected by laterally extending and diagonally extending frame bars 16. A hitch 18 is pivotally connected to the forward end of the frame and a plurality of plow bottoms 19 are secured to and depend from the frame.

The plow frame is supported on a front furrow wheel 20, a land wheel 22 and a rear furrow wheel 24. The front furrow wheel 20 is journaled on the lower end of a crank arm 26 on one end of a shaft 28 which extends transversely across and is journaled on the plow frame. The land wheel 22 is journaled on the lower end of a crank arm 32 on the outer end of a transversely extending shaft 30 journaled on the frame bars 14. The rear furrow wheel 24 is also mounted on the lower end of a crank arm 34 which has its opposite ends pivotally connected to the frame.

An extensible and retractable hydraulic cylinder 36 has its opposite ends connected between the plow frame and a lever arm 38 secured to the shaft 28 so that upon extension and retraction of the cylinder 36, the shaft 28 is rocked about its longitudinal axis to lower and raise the plow frame on the front furrow wheel 20. The cylinder 36 is illustrated only as an example of how the shaft 28 can be rocked about its longitudinal axis to raise and lower the frame on the front furrow wheel and, although not illustrated, could also be interconnected with the land wheel 22 and rear furrow wheel 24 to raise and lower the frame on these wheels simultaneously with the raising and lowering of the frame on the front furrow wheel 20. The precise manner in which the hydraulic cylinder 36 is interconnected with the shafts 28 and 30 and the crank arm 34 forms no part of the present invention, but a full description and illustration of how the single cylinder can be used to control the movement of the plow frame on all three wheels can be had by reference to U.S. Pat. No. 3,349,855 which issued to G. C. Knudson on 31 Oct. 1967.

A depth control mechanism 40 for limiting the movement of the frame on the front furrow wheel 20 is best illustrated in FIGS. 2–5. The depth control mechanism includes an upwardly extending lever arm 42 secured to the shaft 28 and an anchor member or upwardly extending rigid arm 44 mounted on the box beam 12. The forward end of a front bar 46 is pivotally connected to the upper end of the lever arm 42 by a pivot pin 48 and has its rear end sandwiched between a pair of rear bars 50 which have their forward ends rigidly secured to the front bar in any suitable manner such as welding. The rear bars 50 extend rearwardly past the rigid arm 44 on opposite sides thereof, and each is provided with an elongated slot 52 which slidably receives the ends of a pin 54 which extends through and is secured to the rigid arm 44. The front and rear bars 46 and 50 constitute a link means which interconnects the lever arm 42 with the rigid arm 44 through a lost-motion connection formed by the slots 52 and the pin 54.

A pair of generally triangular plates 56 are positioned on opposite sides of the front bar 46 and have one corner thereof pivotally connected to a forward portion of the front bar 46 by a pivot pin 58. A second corner of each of the plates 56 is located above the rear end of the front bar 46 and has an integral projection 60 extending rearwardly therefrom. The projections 60 on the upper rear corner of the plates 56 are interconnected by a short bar 62 which extends across the ends of the projections and is secured thereto in any suitable manner such as welding. A third corner of each of the plates 56 is located beneath the link means and these corners are also interconnected by a short bar 62 which extends across the ends of the plates and is secured thereto in any suitable manner such as welding. The outer face of each of the bars 62 is facing generally rearwardly and each bar is provided with a threaded aperture which receives a bolt 64. Lock nuts 66 on the bolts 64 retain the bolts 64 in any adjusted position on the bars 62. The plates 56 constitute a stop member having a first abutment formed by the connecting bar 62 and bolt 64 on the upper rear corner of the plates and a second abutment formed by the connecting bar 62 and bolt 64 on the lower rear corner of the plates 56.

The plates 56 or the stop member is free to pivot on the front bar 46 between a first raised position determined by contact between the link means and the lower connecting bars 62 and a second lower position determined by contact between the link means and the upper connecting bar 62. The stop member can be locked in either the first or second position by a pin 68 which is inserted through either an upper aperture 70 in the stop member or a lower aperture 72 in the stop member and a corresponding aperture provided in the front link means 46.

The operation of the above-described depth control mechanism is as follows. Prior to making the first pass or the land-opening pass through a field, the operator will raise the plow to a transport position illustrated in FIG. 4. He will then move the stop member or plates 56 to the second position or land-opening position illustrated in FIG. 5 so that when the plow frame is lowered, the bolt 64 on the lower rear corner of the stop member engages the rigid arm 44 and prevents additional lowering movement of the frame on the front furrow wheel. By adjusting the bolt 64 on the lower rear corner of the stop member in or out, the precise plowing depth desired can be obtained. The operator then makes the land-opening pass through the field. On the subsequent pass through the field, the front furrow wheel 20 will run in the furrow formed during the land-opening pass and therefore the frame cannot be lowered to the same position with respect to the front furrow wheel or the plowing depth will be doubled. Therefore, prior to making the second pass through the field, the operator again raises the plow to the transport position and moves the stop member 56 to the first position or normal plowing position illustrated in FIGS. 2 and 4. When the plow frame is again lowered, the bolt 64 on the upper rear corner of the stop member 56 contacts the rigid arm 44 to limit additional lowering movement of the frame. By adjusting the bolt 64 on the upper rear corner of the stop member 56, the frame can be adjusted on the front furrow wheel until the plow bottoms are working at exactly the same depth as they did during the land-opening pass.

When the plow is raised to the transport position illustrated in FIG. 4, engagement between the rear ends of the slots 52 and the pin 54 limits rotation of the shaft 28 so that the crank arm 26 cannot reach the vertical position and thereby prevent the plow from lowering under its own weight.

From the foregoing, it can be seen that the present invention provides a very simple depth control mechanism which selectively limits the lowering movement of the plow frame on the front furrow wheel to either a normal plowing position or a land-opening position and which includes simple adjustment means which can be used to vary the position of the plow frame with respect to the front furrow wheel in either one or both of the normal plowing position or the land-opening position without affecting the position of the frame on the front furrow wheel when in the other position.

Having thus described one preferred embodiment of the invention, various modifications and changes within the spirit and scope of the invention will become apparent to those skilled in the art and can be made without departing from the underlying principles of the invention. Therefore, the invention should not be limited to the specific description and illustration, but only by the following claims.

I claim:

1. In a plow including a frame having a plurality of plow bottoms secured to and depending therefrom, wheel means including a front furrow wheel supporting the frame; adjustable means connected between the frame and each of the wheel means to raise and lower the frame on the wheel means between raised transport and lowered plowing positions, and power means connected between the frame and adjustable means to raise and lower the frame, the improvement comprising: generally upwardly extending lever means associated with the adjustable means having an upper end movable generally forwardly and rearwardly upon raising and lowering movement, respectively, of the frame; a rigid vertical arm secured to the frame; link means slidably connected to the rigid arm and having one end connected to the lever means; a stop member pivotally mounted on the link means for selective movement between first and second position; a first abutment on the stop member engageable with the rigid arm when the stop member is in the first position to limit lowering movement of the frame on the front furrow wheel to a normal plowing position; and a second abutment on the stop member engageable with the rigid arm when the stop member is in the second position to limit lowering movement of the frame on the front furrow wheel to a land-opening position below the normal plowing position.

2. The plow set forth in claim 1 wherein each of the first and second abutments are independently adjustable whereby the position of the frame on the front furrow wheel can be varied in either one or both of the normal plowing positions and the land-opening position.

3. The plow set forth in claim 2 further including means to releasably lock the stop member in either the first or second position.

4. In a plow including a frame having a plurality of plow bottoms secured to and depending therefrom, support wheel means including a front furrow wheel, adjustable means mounting the frame on the wheel means for vertical movement between raised transport and lowered plowing positions, the adjustable means for the front furrow wheel including a rotatable member mounted on the frame for rocking movement and means connected between the front furrow wheel and rotatable member to raise and lower the frame upon rocking movement of the rotatable member, and means connected between the frame and rotatable member to control the rocking movement of the rotatable member, the improvement comprising: an anchor member secured to the frame; lever means having one end secured to the rotatable member and a second end movable toward and away from the anchor member upon rocking movement of the rotatable member; link means slidably connected to the anchor member and having an end connected to the second end of the lever means; a stop member pivotally mounted on the link means for selective movement between first and second positions; first abutment means on the stop member engageable with the anchor member when the stop member is in the first position to limit lowering movement of the frame to a normal plowing position; and second abutment means on the stop member engageable with the anchor member when the stop member is in the second position to limit lowering movement of the frame to a land-opening position below the normal plowing position.

5. The plow set forth in claim 4 wherein the anchor member and lever means extend above the frame, the anchor member is mounted on the frame rearwardly of the rotatable member, and the stop means is mounted on the link means between the anchor member and lever means.

6. The plow set forth in claim 4 wherein the slidable connection between the link means and anchor member includes an elongated slot provided in the link means and pin means secured to the anchor member and extending through the slot, whereby engagement between one end of the slot and the pin means limits movement of the rotatable member in a direction to raise the frame.

7. The plow set forth in claim 6 further including means to releasably lock the stop member in either the first or second position.

8. The plow set forth in claim 7 wherein the first and second abutment means are independently adjustable whereby the position of the frame with respect to the front furrow wheel in either one or both of the normal plowing position or land-opening position can be varied.

9. In a plow including a frame having a plurality of plow bottoms secured to and depending therefrom, support wheel means including a front furrow wheel, adjustable means mounting the frame on the wheel means for vertical movement between raised transport and lowered plowing positions, the adjustable means for the front furrow wheel including a shaft mounted on the frame for rocking movement and a crank arm secured to the shaft and having the front furrow wheel mounted on its free end below the frame, and means connected between the frame and shaft to control the movement of the shaft and raise and lower the frame on the front furrow wheel, the improvement residing in depth control means comprising: an anchor member secured to the frame; lever means secured to the shaft for movement toward and away from the anchor member upon rocking movement of the shaft; link means having a lost-motion connection with the anchor member and having a pivotal connection with the lever means; a stop member pivotally mounted on the link means for selective movement between first and second positions; first abutment means on the stop member engageable with the anchor member when the stop member is in the first position to limit movement of the shaft in a direction to lower the frame and to limit lowering movement of the frame to a normal plowing position; and second abutment means on the stop member engageable with the anchor member when the stop member is in the second position to limit movement of the shaft in a direction to lower the frame and to limit lowering movement of the frame to a land-opening position below the normal plowing position.

10. The plow set forth in claim 9 wherein the anchor member and lever arm extend above the frame, the anchor member is mounted on the frame rearwardly of the shaft, and the stop member is pivotally mounted on the link between the lever means and anchor member.

11. The plow set forth in claim 10 wherein the anchor member is an upwardly extending rigid arm having its lower end secured to the frame, the link means includes a front bar having its forward end pivotally connected to the lever means and a pair of rear bars having forward end portions rigidly secured to opposite sides of the rear end portion of the front bar, the rear bars being positioned on opposite sides of the rigid arm, and the lost-motion connection between the link means and anchor member includes elongated slots provided in the pair of rear bars and pin means carried by the rigid arm and extending through the slots.

12. The plow set forth in claim 11 wherein the stop member includes a pair of plates positioned on opposite sides of the link means and having forward portions pivotally connected to a forward portion of the front bar, the pair of plates having an upper rear portion positioned above the link means and a lower rear portion positioned below the link means and forwardly of the upper rear portion, the first and second abutment means each having a member extending between and interconnecting the upper rear and lower rear portions, respectively, of the plate means, and the first abutment means is in horizontal alignment with the upper portion of the rigid arm when the stop member is in the first position and is above the upper end of the rigid arm when the stop member is in the second position.

13. The plow set forth in claim 12 further including means to selectively lock the stop member in either the first or second position.

14. The plow set forth in claim 13 wherein the means to selectively lock the stop member in either of the first and second positions includes a pair of upper and lower apertures provided in the pair of plates, a corresponding aperture provided in the front bar, and pin means insertable through the aperture in the bar and selected ones of the upper and lower apertures provided in the pair of plates.

15. The plow set forth in claim 12 wherein each of the first and second abutment means is adjustable whereby the position of the frame with respect to the front furrow wheel can be varied in either one or both of the normal plowing positions and the land-opening position.

* * * * *